United States Patent
Kim et al.

(10) Patent No.: US 9,435,996 B2
(45) Date of Patent: Sep. 6, 2016

(54) ILLUMINATION OPTICAL SYSTEM FOR BEAM PROJECTOR

(71) Applicant: Samsung Electronics Co., Ltd., Gyeonggi-do (KR)

(72) Inventors: Yong-Kwan Kim, Gyeonggi-do (KR); Seong-Ha Park, Gyeonggi-do (KR); Yong-Chan Keh, Seoul (KR); Jung-Kee Lee, Gyeongg-do (KR); Joong-Wan Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 391 days.

(21) Appl. No.: 13/965,429

(22) Filed: Aug. 13, 2013

(65) Prior Publication Data

US 2014/0160441 A1 Jun. 12, 2014

(30) Foreign Application Priority Data

Dec. 7, 2012 (KR) .................... 10-2012-0141991
Dec. 26, 2012 (KR) .................... 10-2012-0153104

(51) Int. Cl.

| G03B 21/20 | (2006.01) |
|---|---|
| G02B 26/00 | (2006.01) |
| F21V 9/08 | (2006.01) |
| F21V 9/10 | (2006.01) |
| G03B 33/08 | (2006.01) |

(52) U.S. Cl.
CPC ............. *G02B 26/008* (2013.01); *F21V 9/08* (2013.01); *F21V 9/10* (2013.01); *G03B 21/204* (2013.01); *G03B 21/2066* (2013.01); *G03B 33/08* (2013.01)

(58) Field of Classification Search
CPC .... G03B 21/204; G03B 21/14; G03B 21/00; G02B 26/00; F21V 9/08; F21V 9/10
See application file for complete search history.

(56) References Cited

U.S. PATENT DOCUMENTS

| 8,167,440 | B2 | 5/2012 | Sato et al. | |
|---|---|---|---|---|
| 2007/0230179 | A1* | 10/2007 | Ripoll | G02B 26/008 362/277 |
| 2010/0328554 | A1* | 12/2010 | Shibasaki | H04N 9/3161 348/760 |
| 2011/0234998 | A1 | 9/2011 | Kurosaki | |
| 2012/0050691 | A1 | 3/2012 | Tsuda et al. | |

(Continued)

FOREIGN PATENT DOCUMENTS

| EP | 2 519 013 A1 | 10/2012 |
|---|---|---|
| JP | 2006-58339 A | 3/2006 |

(Continued)

*Primary Examiner* — Sultan Chowdhury
*Assistant Examiner* — Danell L Owens
(74) *Attorney, Agent, or Firm* — Cha & Reiter, LLC.

(57) ABSTRACT

An illumination optical system for a beam projector includes: a light source; a color conversion unit having at least one fluorescent substance layer that reflects a light from the light source or converts the light emitted from the light source to a wavelength-converted light; and a dichroic mirror that causes the light emitted from the light source to be incident on the color conversion unit. Lights reflected or emitted by the conversion unit and having different wavelengths are incident on a display panel through the same path. In the illumination optical system, a light emitted from one light source can be processed to produce red, green and blue lights which can be in turn incident on the display panel through the same optical path of the light reflected or emitted by the conversion unit.

25 Claims, 8 Drawing Sheets

(56) References Cited

U.S. PATENT DOCUMENTS

| | | | | |
|---|---|---|---|---|
| 2012/0300178 A1* | 11/2012 | Sugiyama | ............ | H04N 9/3111 353/31 |
| 2013/0002972 A1* | 1/2013 | Tanaka | ............... | G02B 27/1046 349/8 |
| 2013/0057833 A1* | 3/2013 | Katou | ...................... | G02B 5/26 353/31 |
| 2013/0250546 A1* | 9/2013 | Hu | ............................ | F21V 9/08 362/84 |
| 2013/0329426 A1* | 12/2013 | Finsterbusch | ............. | F21K 9/56 362/235 |
| 2014/0125956 A1* | 5/2014 | Chifu | ..................... | G02B 27/48 353/31 |

FOREIGN PATENT DOCUMENTS

| | | |
|---|---|---|
| JP | 2011-075673 A | 4/2011 |
| KR | 10-2012-0130610 A | 12/2012 |
| WO | 2011/076213 A1 | 6/2011 |

\* cited by examiner

ILLUMINATION OPTICAL SYSTEM FOR BEAM PROJECTOR

CLAIM OF PRIORITY

This application claims the priority under 35 U.S.C. §119(a) to Korean Application Serial No. 10-2012-0141991, which was filed in the Korean Intellectual Property Office on Dec. 7, 2012 and Korean Application Serial No. 10-2012-0153104, which was filed in the Korean Intellectual Property Office on Dec. 26, 2012, the entire contents of which are hereby incorporated by reference.

BACKGROUND

1. Field of the Invention

The present disclosure relates generally to an optical apparatus, and more particularly, to an optical system for a beam projector that magnifies an image picture output from a display panel and projects the magnified image picture to a screen.

2. Description of the Related Art

A beam projector is a light instrument that facilitates the implementation of a large image picture using an optical system and a display panel. The size of the image picture can be adjusted according to a distance between the beam projector and a screen. If it is possible to secure a sufficient distance to the screen, it is easy to implement a large image picture having high definition regardless of the size of the display apparatus.

An optical system in a beam projector structure may be classified into an illumination optical system and a transmissive optical system. The illumination optical system represents an optical system formed by optical components arranged from the light source to the display panel, and the transmissive optical system represents an optical system formed by optical components arranged from the display panel to a projection lens configured to project an image. In operation, a light produced from the light source progresses through the illumination optical system to be incident on the display panel, and an image picture implemented on a display panel progresses through the transmissive optical system to be finally projected to the outside of the beam projector through a transmissive lens.

Typically, a projection optical system magnifies an image picture implemented on a display panel and projects the image picture to a screen. The definition of the image picture can be selectively adjusted through focusing. The illumination optical system makes red, green, and blue lights individually incident on the display panel. Light-emitting diodes are used to provide a light source in configuring an illumination optical system, thereby remarkably improving the color reproduction of the beam projector. Furthermore, a product using laser diodes as a light source has been proposed. U.S. Pat. No. 8,167,440 (registered on May 1, 2012) discloses a structure in which light emitting diodes and laser diodes are combined as a light source of an illumination optical system. The illumination optical system disclosed in the U.S. patent uses a combination of a laser diode emitting a blue laser light and a light-emitting diode emitting a red light as a light source, and the red, green and blue lights progress along different paths, respectively, to arrive at the display panel.

Recently, technical developments are made to miniaturize such a beam projector to be equipped in a portable terminal, such as, for example, a mobile communication terminal, a portable computer, a multimedia player, and a compact digital camera. With this implementation, it becomes possible to project a data or a moving picture stored in a portable terminal equipped with a beam projector.

The miniaturization of a display panel and an optical system is essentially required to configure a miniaturized beam projector. A compact flat device, such as a DMD (digital micro-mirror device) and an LCoS (liquid crystal on silicon) has been developed as a display panel and is applied to a beam projector. However, as described above, although an illumination optical system is improved in color reproduction by using a plurality of light-emitting diodes and/or laser diodes, lights progress along different paths in the illumination optical system depending on the colors of the lights to be incident on the display panel which requires a plurality of optical components, for example lenses and mirrors. A plurality of light sources and these lenses and mirrors are arranged on the different optical paths which are difficult to miniaturize when implemented in a portable terminal.

SUMMARY

Accordingly, an aspect of the present invention is to provide an illumination optical system for a beam projector that is capable of making optical paths of lights conform to each other even if the lights have different colors.

Another aspect of the present invention is to provide an illumination optical system for a beam projector that makes optical paths of lights conform to each other to share optical components, thereby facilitating miniaturization.

Yet another aspect of the present invention is to provide an illumination optical system and a beam projector using the same in which the illumination optical system may implement red, green, yellow and blue colors only using laser diodes without a light emitting diode as a light source so that the configuration of the illumination optical system may be simplified, thereby simplifying the configuration thereof, reducing manufacturing costs, and miniaturizing the illumination optical system.

Yet another aspect of the present invention is to provide an illumination optical system and a beam projector including the same in which the illumination optical system is capable of maintaining optical efficiency regardless of the number of laser diodes by using a total reflection prism.

Still another aspect of the present invention is to provide an illumination optical system and a beam projector including the same in which the illumination optical system seeks configurational simplification using a light source that employs a single blue laser diode, a plurality of prisms, and a rotational wheel provided with a reflection region at a predetermined area.

According to an aspect of the present invention, an illumination optical system for a beam projector includes: a light source; a color conversion unit having at least one fluorescent substance layer that reflects light emitted from the light source or converts a wavelength of the light emitted from the light source to a wavelength-converted light; and a dichroic mirror displaced at a predetermined angle for deflecting the light emitted from the light source to be incident on the color conversion unit. Lights reflected or the wavelength-converted light emitted by the conversion unit having different wavelengths are incident on a display panel through the same path.

According to still another aspect of the present invention, an illumination optical system for a beam projector includes: a light source; and a color conversion unit formed having at least one fluorescent substance layer that converts the wavelength of the light emitted from the light source to a wavelength-converted light. The conversion unit may include: a reflective plate that is rotated about a rotation axis substantially parallel to the direction of the optical axis of the light emitted from the color conversion unit; and a reflective layer that reflects the blue laser light emitted from the light source. The fluorescent substance layer may be configured by forming a green fluorescent substance layer and a red fluorescent substance layer that are excited by the light emitted from the light source to emit a green light and a red light, respectively, and the light reflected by the reflective layer and the light emitted by the fluorescent substance layer are incident on a display panel through the same path.

The above optical system for a beam projector according to the teachings of the present invention may be incorporated in a portable terminal, a portable computer, a multimedia player, a compact digital camera, or any duplex system adapted to project a data or a moving picture stored therein.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, various embodiments of the present invention will be described with reference to the accompanying drawings. For the purposes of clarity and simplicity, a detailed description of known functions and configurations incorporated herein will be omitted as it may make the subject matter of the present invention rather unclear.

Figure 1:
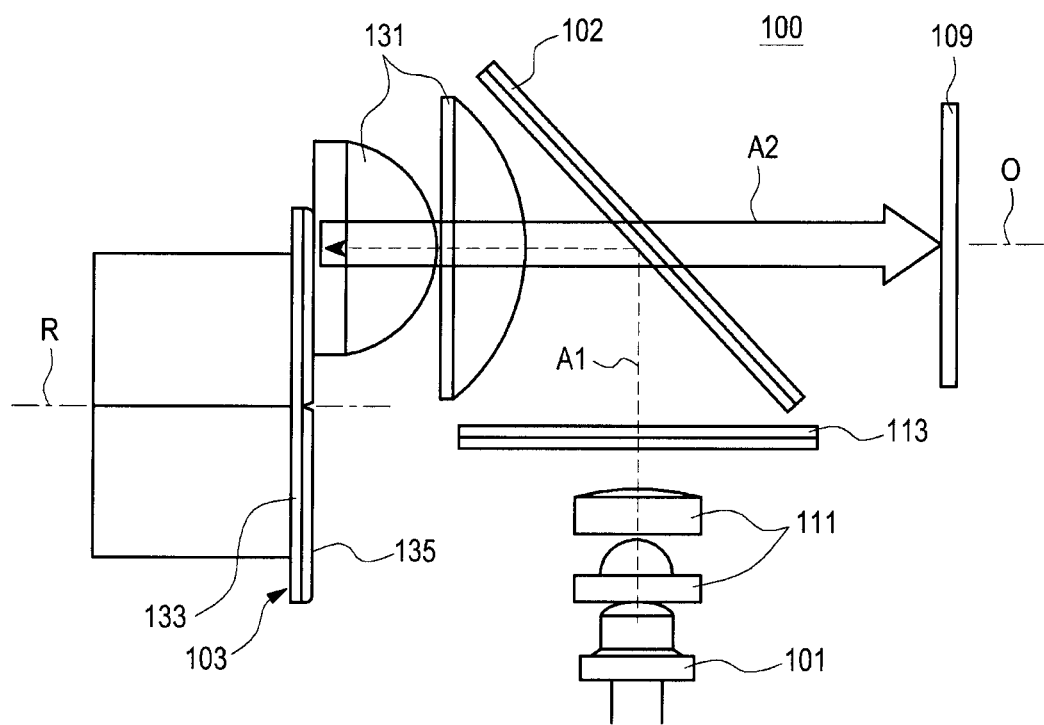
FIG. 1 illustrates an illumination optical system for a beam projector according to an exemplary embodiment of the present invention.

FIG. 1 illustrates a configuration of an illumination optical system 100 for a beam projector. As shown, the illumination optical system 100 for a beam projector includes a light source 101, a color conversion unit 103, and a dichroic mirror 102, in which a light emitted from the light source 101 is incident on the color conversion unit 103 via the dichroic mirror 102, and lights emitted by the color conversion unit 103 having different wavelengths transmit in the same path in reverse direction to be incident on the display panel 109. Here, the colors of the lights are determined according to the frequencies of the lights, respectively. Thus, "the lights having different wavelengths" as described above indicates the lights having different colors.

According to an exemplary embodiment, a laser diode, specifically, a laser diode emitting a blue laser light may be used as the light source 101. Alternatively, a laser diode emitting a ultra-violet laser light may be used as the light source 101. The laser light has a fixed wavelength and hence has one color. In operation, the laser light suffers from a small change in diameter on the progressing path but is excellent in straightness. Hence, when configuring an illumination optical system for a beam projector using a laser diode as a light source, it is preferable that the laser light emitted from the light source 101 is made to transmit a diffusion plate 113 to diffuse the optical power.

The color conversion unit 103 is formed with a fluorescent substance layer 135, and the fluorescent substance is excited by the light emitted from the light source 101 to convert the wavelength of the light, in other words, to produce and emit a light of a different color. In such event, when the light emitted from the light source 101 is concentrated to a narrow area while being incident on the color conversion unit 103, the fluorescent substance may be damaged. To overcome this, the optical power of the light source 101 is diffused over a wider area using the diffusion plate 113. In addition, for example, a lens 111 for adjusting the path or the beam shape of the laser light emitted from the light source 101 may be arranged on the progressing path A1 of the laser light.

Since the color conversion unit 103 includes the fluorescent substance layer 135, the color conversion unit 103 processes the laser light emitted from the light source 101 to emit red, green, and blue lights. Here, when the light source 101 emits a blue laser light, the color conversion unit 103 may be provided with a reflective layer that reflects the blue light received thereon. Alternatively, when the light source 101 emits an ultra-violet laser light, a fluorescent substance layer of the color conversion unit 103 is excited the ultraviolet laser light received thereon to emit a blue light therefrom.

Figure 5:
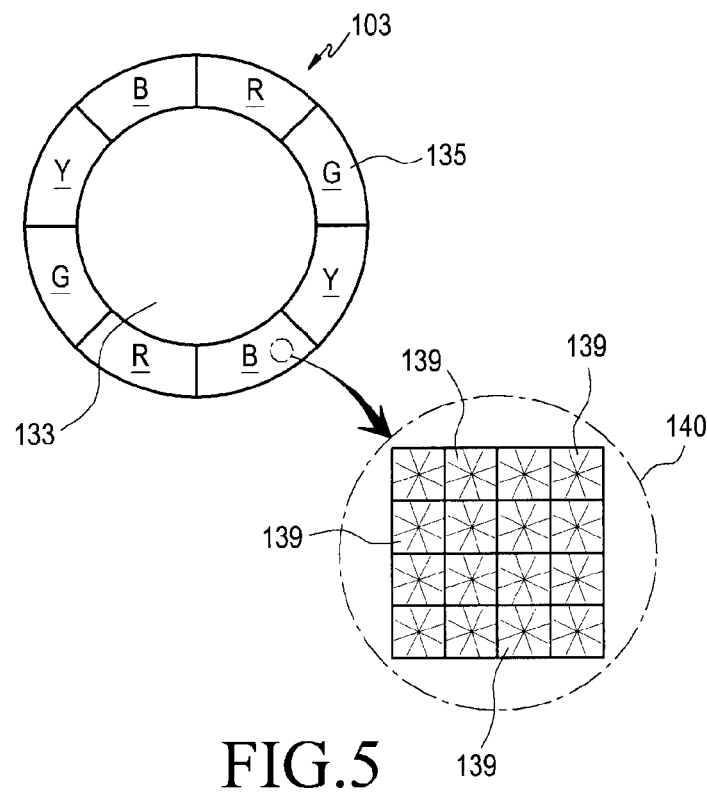
FIG. 5 is a top plan view illustrating a color conversion unit of the illumination optical system illustrated in FIG. 1.

Referring to FIG. 5, the color conversion unit 103 may include a fluorescent substance layer 135 excited by a laser light to emit a red, green or blue light. The fluorescent substance layer 135 may be divided into red fluorescent substance layers (R), green fluorescent substance layers (G), and blue fluorescent substance layers (B), in which the red, green and blue fluorescent substance layers (R, G, B) are circumferentially arranged around the fluorescent substance layer 135 of the color conversion unit 103.

If the light source 101 is a laser diode that emits a blue laser light, each of the blue fluorescent substance layers (B) may be replaced by a reflective layer 140. As shown in FIG. 5, in which a part of a blue fluorescent substance layer (B) is illustrated in an enlarged scale, the reflective layer 140 is formed by an arrangement of conical or many-sided pyramid-shaped reflective protrusions 139. Note that the reflective protrusions 139 may have a curved shape with a predetermined curvature or a semi-sphere shape in addition to the conical or many-sided pyramid shape.

Meanwhile, the color conversion unit 103 may be further provided with a yellow fluorescent substance layer (Y). The yellow fluorescent substance layer (Y) is excited by the light incident on the color conversion unit 103, thereby emitting yellow light. The color conversion unit 103 provided with the yellow fluorescent substance layer (Y) may provide brighter illumination to the display panel 109 as compared to the color conversion unit that is not provided with the with the yellow fluorescent substance layer (Y). With the provision of blue, red, and green illuminations, almost all the colors recognizable time to time may be implemented, and the yellow fluorescent substance layer (Y) is provided to improve the brightness of illumination. Therefore, it is not necessarily required to form the yellow fluorescent substance layer (Y).

The fluorescent substance layer 135 as described above is formed on a circular reflective plate 133, and the reflective plate 133 is rotated about a rotation axis R parallel to the optical direction of the light emitted from the color conversion unit 103, more specifically to the optical direction O of the condensing lens 131 to be described later. The light emitted from the light source 101 on the color conversion unit 103 is incident on a fixed position, and as the reflective plate 133 is rotated, a fluorescent substance layer producing any one color for a predetermined time interval is excited. Accordingly, if the reflective plate 133 is rotated while the light source 101 is emitting a laser light, the color conversion unit 103 alternately emits red, green, and blue light.

In that event, if the light source 101 emits a blue laser light, and the blue fluorescent substance layers (B) are replaced by reflective layers 140, the color conversion unit 103 will practically reflect the blue laser light rather than emitting the blue light. As described above, the reflective layer 140 is formed by an arrangement of conical, many-sided pyramid-shaped, or curved reflective protrusions 139. Therefore, the light reflected by the reflective layer 140 is diffused to a predetermined area while the laser light originally emitted from the light source 101 is concentrated to relatively narrow area.

Figure 6:
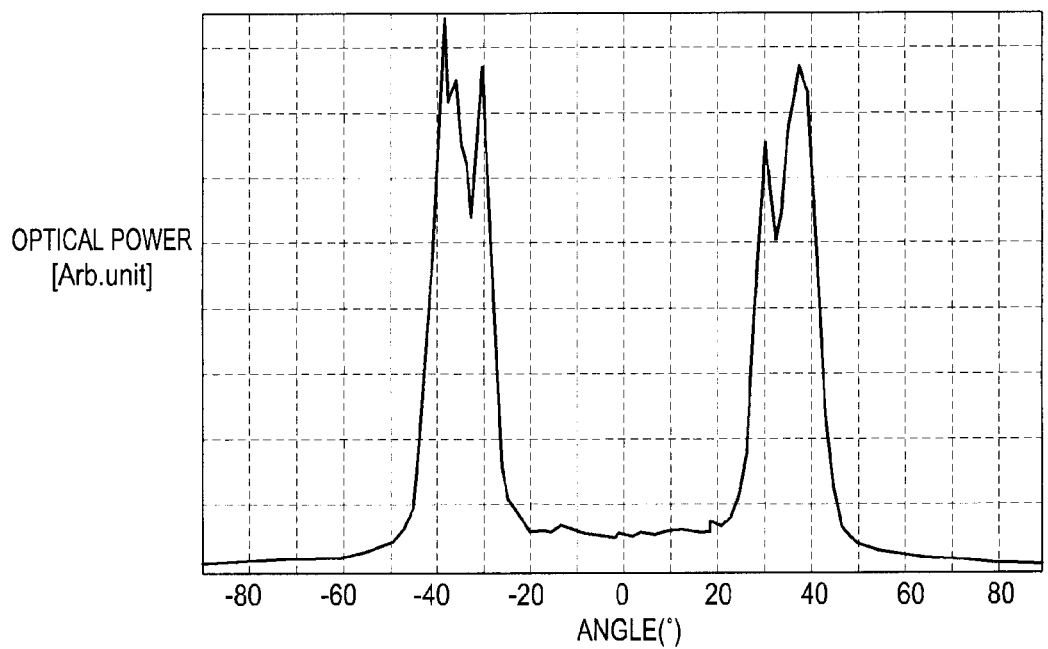
FIG. 6 is a graph for describing a reflective characteristic of a reflective layer of the color conversion unit illustrated in FIG. 5.

FIG. 6 is a graph showing an optical power measured for a light reflected by the reflective layer when the reflective layer is formed by conical reflective protrusions 139. In the graph illustrated in FIG. 6, the angle of zero (0) degrees represents the optical axis of the blue laser light practically incident on the reflective layer. Relative optical power values were measured in the angular range of 180 degrees around the optical axis of the laser light incident on the reflective layer. It can be seen that the optical power of the blue light reflected by the structure of the reflective layer is concentrated at an angular area of 20 degrees to 50 degrees, more specifically 30 degrees to 40 degrees with reference to the optical axis of the incident light. Accordingly, the blue light reflected by the reflective layer 140 will form a circular band shape on a plane perpendicular to the optical axis of the incident light at a particular distance from the reflective layer. Hence, the blue light is processed to a form suitable for the display panel 109 during the process of being passed through other optical components, for example, a condensing lens 131 and a lens 111 for adjusting a beam shape.

The dichroic mirror 102 changes the path A1 of the laser light emitted from the light source 101 to make the laser light incident on the color conversion unit 103. On one side of the dichroic mirror 102, reflective areas 121 and 123 are formed to reflect a blue laser light or an ultra-violet (UV) laser light. When the dichroic mirror 102 is positioned on the path A2 where the light emitted from color conversion unit 103 is propagated, it is preferable to provide a transmissive area 125 that allows the transmission of the blue light emitted from color conversion unit 103.

Figure 2:
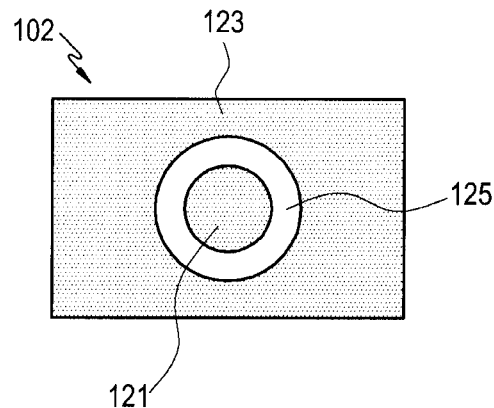
FIG. 2 is a top plan view illustrating a dichroic mirror of the illumination optical system illustrated in FIG. 1.

Referring to FIG. 2, the reflective area of the dichroic mirror 102 includes a first reflective area 121 formed on one side of the dichroic mirror 102, and a second reflective area 123 formed around the first reflective area 121, and the transmissive area 125 is formed between the first and second reflective areas 121 and 123. Preferably, the transmissive area 125 has a substantially circular band shape. However, since the dichroic mirror 102 is obliquely positioned in relation to the optical axis of the light source 101 and the optical axis of the light emitted from the color conversion unit 103, the transmissive area 125 may project an oval shape.

The dichroic mirror 102 transmits the blue light reflected by the color conversion unit 103 as describe above, but reflecting the blue laser light emitted from light source 101. That is, when the light source 101 emits the blue laser light, and a reflective layer 140 that reflects the blue laser light is formed on the color conversion unit 103. The blue light reflected by the reflective layer 140 has a circular band shape on a plane perpendicular to the optical axis of the incident light at a distance from the reflective layer 140. Accordingly, the dichroic mirror 102 having the reflective areas 121 and 123 and the transmissive area 125 as illustrated in FIG. 2 is an especially suitable structure when the light source 101 emits a blue laser light in a circular band shape for passing, and the color conversion unit 103 is formed with a reflective layer 140 that reflects the blue laser light.

Meanwhile, in the process where the fluorescent substance layer 135 is excited to emit red and green lights, the blue light may be partially reflected by the color conversion unit 103, thereby deteriorating the color reproduction of red and green colors. However, since the first and second reflective areas 121 and 123 reflect the blue light, and transmit only the red and green lights, it is possible to suppress the deterioration of the color reproduction for the red and green colors.

Figure 3:
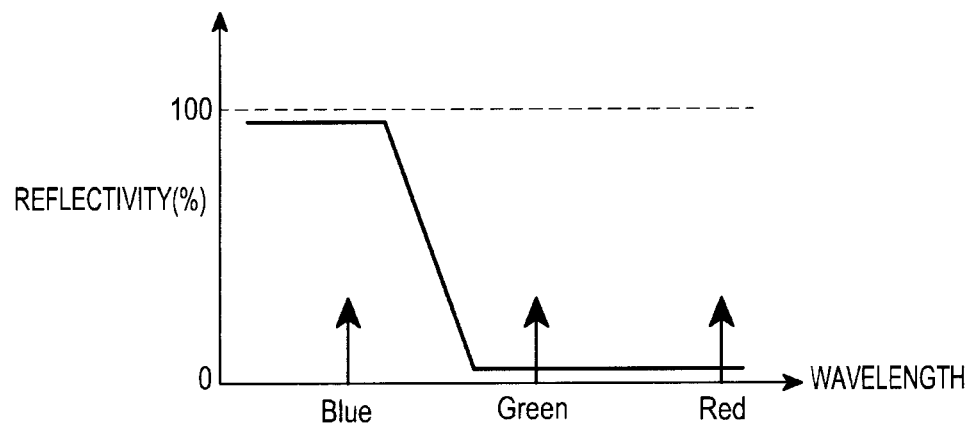
FIGS. 3 and 4 are view for describing a reflective characteristic of the dichroic mirror illustrated in FIG. 2.
Figure 4:
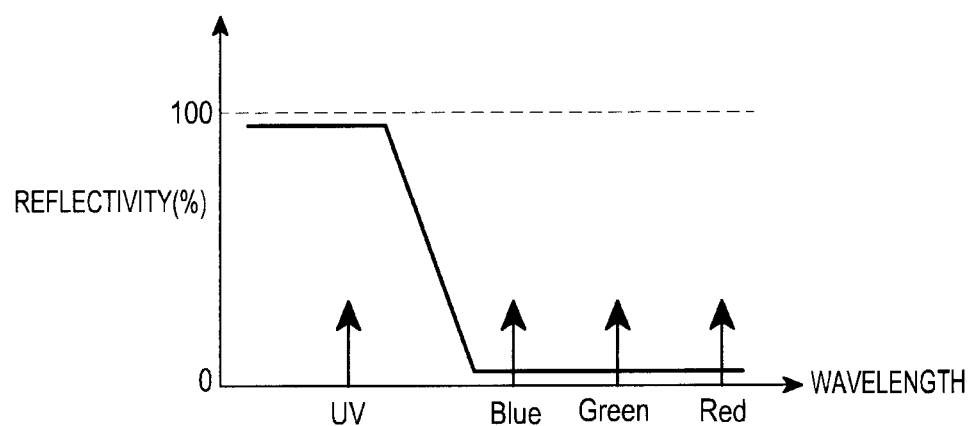

FIGS. 3 and 4 are views for describing the reflective characteristic of the dichroic mirror 102 illustrated in FIG. 2. In particular, from FIG. 3, it can be seen that the first and second reflective areas 121 and 123 have a reflectivity of nearly 100% for the blue light (Blue) and a transmissivity of nearly 100% for the red and green lights (Red, Green). In addition, when the light source 101 outputs an ultra-violet laser light, the entirety of one side of the dichroic mirror 102 is preferably formed as an ultra-violet reflective area. In such a case, it is evident that the reflective area of the dichroic mirror 102 has a reflectivity characteristic of nearly 100% for an ultra-violet ray while having a transmissivity characteristic of nearly 100% for red, green and blue lights (Red, Green, and Blue) as illustrated in FIG. 4.

When the light source 101 emits a blue laser light, the blue laser light is reflected by the first or second reflective area 121 or 123 to be incident on the color conversion unit 103. In addition, the light emitted or reflected from the color conversion unit 103 is practically transmitted through the dichroic mirror 102 to be incident on the display panel 109. At this time, the red or green light emitted from the color conversion unit 103 is propagated not only through the transmissive area 125 but also through the first and second reflective areas 121 and 123. The blue light emitted or reflected from the color conversion unit 103 is propagated through the transmissive area 125. When the light source 101 emits an ultra-violet laser light, the red, green and blue lights produced and emitted from the color conversion unit 103 are propagated through the reflective areas of the dichroic mirror 102.

Meanwhile, optical components, such as condensing lenses 131, may be arranged between the dichroic mirror 102 and the color conversion unit 103 to adjust the path or beam shape of a light incident on the color conversion unit 103 or a light emitted from the color conversion unit 103. Here, the condensing lenses 131 collect the light reflected by the dichroic mirror 102 and incident on the color conversion unit 103 to a predetermined position, and adjust the propagation path A2 of the light emitted from the color conversion unit 103 to be substantially parallel to the optical axis O. That is, the light emitted from the color conversion unit 103 is propagated to be substantially parallel to the optical axis O of the condensing lens 131, and is incident on the display panel 109.

The number of optical components arranged between the light source 101 and the display panel 109 can be reduced as red, green and blue lights are individually produced and emitted through the color conversion unit 102, and the lights of different colors are incident on the display panel 109 through the same path. Accordingly, the optical system of the beam projector, in particular the illumination optical system can be simplified in construction to miniaturize the beam projector, which may facilitate the installation of the beam projector to a portable terminal, for example, a mobile communication terminal.

Figure 7:
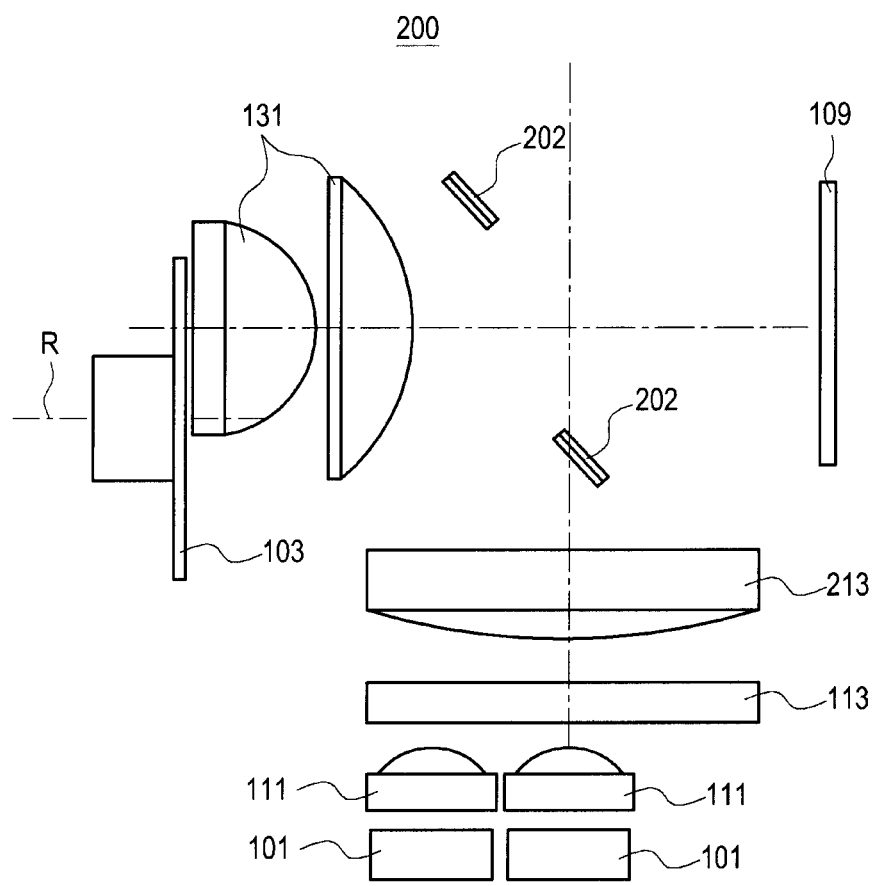
FIG. 7 is a view illustrating a configuration of an illumination optical system for a beam projector according to another exemplary embodiment of the present invention.
Figure 8:
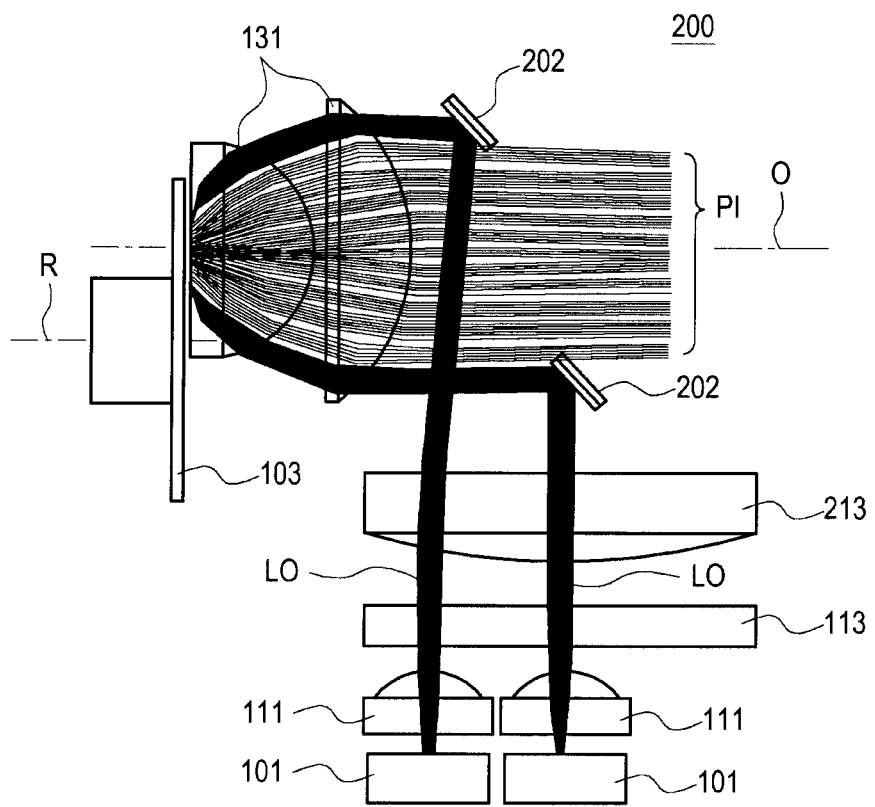
FIG. 8 is a view for describing the operation of the illumination optical system illustrated in FIG. 7.

FIGS. 7 and 8 illustrate an illumination optical system for a beam projector 200 according to another exemplary embodiment of the present invention. The illumination optical system 200 according to the present exemplary embodiment is different from the precedent exemplary embodiment in that the dichroic mirror is replaced by mirrors 202 having a total reflection characteristic. Accordingly, it shall be noted that in describing the present exemplary embodiment in detail, the components that can be easily used from the precedent exemplary embodiment will be denoted by the same reference numerals or the reference numerals or detailed descriptions thereof may be omitted.

As shown, the exemplified illumination optical system 200 includes a plurality of light sources 101. The number of light sources 101 may be variously set in consideration of, for example, a specification required for the beam projector and the power of each light source itself, and it is obvious that only one light source may be used if it satisfies the specification required for the beam projector.

Each of the light sources 101 may be configured by a laser diode that emits a blue laser light or a laser diode that emits an ultra-violet laser light. When a laser diode emitting a blue laser light is used for each of the light sources 101, the fluorescent substance layer 135 of the color conversion unit 103 may be formed by arranging three kinds of layers, which are excited by the blue laser light to emit red, green and blue lights, respectively, along the circumferential direction. At this time, as in the precedent exemplary embodiment, a fluorescent substance layer emitting a blue light (B) may be replaced by reflective layer formed by an arrangement of conical, many-sided pyramid-shaped, or curved reflective protrusions 139. When the laser diode emitting an ultra-violet laser light is used for each of the light sources 101, the fluorescent substance layer 135 of the color conversion unit 103 may be formed by arranging three kinds of layers, which are excited by the ultra-violet laser light to emit red, green and blue lights, respectively, along the circumferential direction.

When the light LO emitted from the light sources 101 is particularly a laser light, a diffusion plate 113 and a lens 213 for adjusting a beam shape is preferably arranged between the light sources 101 and the mirrors 202. As described above, the diffusion plate 113 is provided to diffuse the optical power of the light source 101 more widely so as to prevent, for example, the fluorescent substance layer 135 of the color conversion unit 103 from being damaged. At this time, the light diffused by the diffusion plate 113 is transmitted through the lens 213, and then reflected by the mirror 202. At this time, the mirror 202 is preferably installed out of the propagation path of the light emitted from the color conversion unit 103.

By arranging the dichroic mirror, it is possible to configure the precedent exemplary embodiment such that the laser light emitted from the light source is reflected by the dichroic mirror to be incident on the color conversion unit through a path conforming to the optical axis of the color conversion unit. That is, in the precedent exemplary embodiment, the light incident on the color conversion unit is emitted from the color conversion unit and propagated along the same path as the light transmitted through the condensing lens. However, the propagation direction is opposite to that of the light emitted from the color conversion unit and transmitted through the condensing lens. Whereas, when a mirrors 202 have a total reflection characteristic as in the present exemplary embodiment, the light emitted from the color conversion unit 103 is also reflected by the mirrors 202. Accordingly, in the illumination optical system 200 according to the present exemplary embodiment, the lights reflected by the mirrors 202 to be incident on the condensing lenses 131 are propagated along a direction parallel to the optical axis O of the corresponding condensing lenses 131 out of the optical axis O of the condensing lenses 131. That is, the mirrors 202 are arranged at a position out of the propagation path of the light PI emitted from the color conversion unit 103.

As illustrated in FIG. 8, the illumination optical system 200 according to the present exemplary embodiment, the lights LO emitted from the light sources 101 are propagated to be substantially parallel to each other, and reflected by the mirrors 202. The lights reflected by the mirrors 202 are propagated to be parallel to the optical axis O of the condensing lens 131 and incident on the condensing lenses 131, and the condensing lenses 131 change the paths of the incident lights such that the lights are collected to a predetermined position on the color conversion unit 103. The fluorescent substance layer 135 of the color conversion unit 103 is excited by the incident lights and produces and emits a red, green or blue light according to a time internal. The condensing lenses 131 change the path of a light emitted from the color conversion unit 103 such that the lights are propagated in a direction substantially parallel to the optical axis O. A light emitted from the color conversion unit 103, or a light reflected by the reflective layer of the color conversion unit 103 is subjected to the change of propagation path by the condensing lens to be incident on the display panel 109.

Since the reflective plate 133 of the color conversion unit 103 is rotated as described above, during a time interval for which the red fluorescent substance layer (R) passes a light incident point, the color conversion unit 103 emits a red light. That is, according to the characteristic of a fluorescent substance layer that passes the light incident point, a light of a color emitted by the corresponding fluorescent substance layer is provided to the display panel 109 during the predetermined time interval.

As in the precedent exemplary embodiment, the illumination optical system 200 according to the present exemplary embodiment is configured such that the red, green and blue lights emitted from the color conversion unit 103 are incident on the display panel 109 through the same path and hence the number of optical components thereof can be reduced as compared to a conventional illumination optical system. Accordingly, the miniaturization of the illumination optical system 200 is facilitated.

Figure 9:
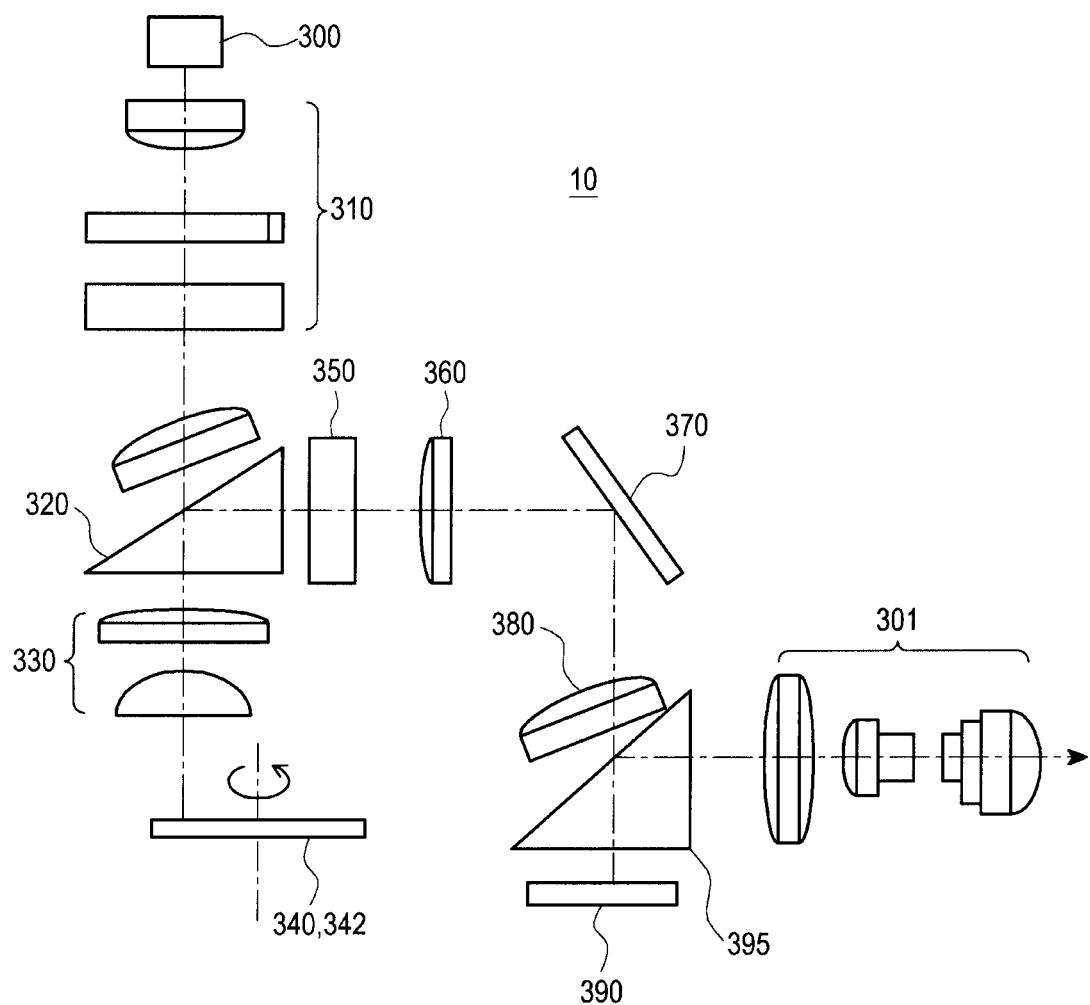
FIG. 9 is a configurational view schematically illustrating a beam projector including an illumination optical system according to another exemplary embodiment of the present invention, along an optical path.

FIG. 9 is a configurational view schematically illustrating a beam projector 10 according to another exemplary embodiment of the present invention. It should be noted that the optical system illustrated in FIG. 9 may be applied to a compact beam projector which may be connected to or employed in a portable device, for example, a mobile communication terminal, a computer, an MP3 player, and a compact digital camera so that it allows a user to view information as desired time and at any place by projecting the content to a screen. Examples of currently popularized mobile communication terminals include a smart phone and a tablet PC.

As described earlier, the beam projector is composed of an illumination optical system and a projection optical system. The illumination optical system represents an optical system arranged on an optical path from a single light source 300 to a display panel 390, and the projection optical system represents an optical system arranged on an optical path from the display panel 390 to a projection lens group 301. An operation process of the illumination optical system, which is provided in the beam projector 10 to emit light beams so as to produce various colors, will be described herein below.

As shown in FIG. 9, the illumination optical system employed in the beam projector 10 according to an exemplary embodiments of the present invention uses a single light source 300 and a rotational wheel 340 or 342 provided as a color conversion unit that causes light beams emanating from the single light source 300 to produce R/G/Y/B colors, in which the light beams emanating from the single light source 300 are collimated/uniformized and then incident on the display panel 390 via reflecting means, and then light beam or output from the display panel 390 is projected to a screen (not illustrated) through the projection lens group 301.

The above-mentioned illumination optical system implements R/G/Y/B colors using the single light source 300 and the rotational wheels 340 and 342.

Figure 10:
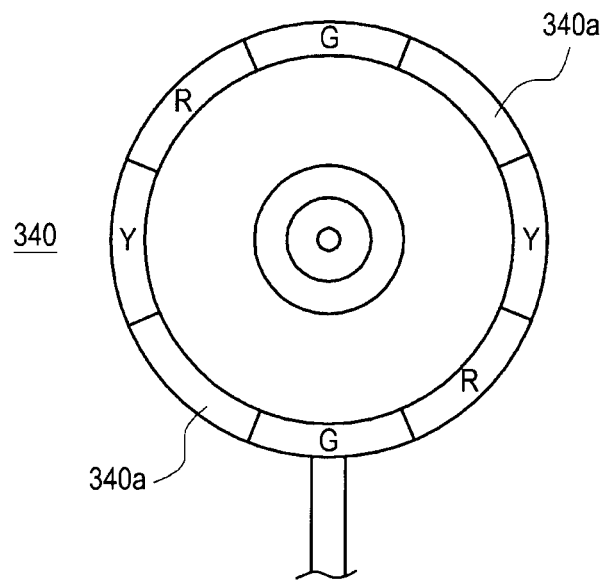
FIG. 10 is a plan view illustrating a rotational wheel used when a blue laser diode is employed as the single light source of the beam projector illustrated in FIG. 9.

FIG. 10 illustrates a configuration of the rotational wheel 340 that is employed when a 450 nm wavelength blue laser diode is employed as the single light source.

Referring to FIG. 10 together with FIG. 9, the single light source 300 is configured by a laser diode, in particular a blue (B) laser diode to emit a blue light beam. In addition, the rotational wheel 340 is composed of a first region (R, G, Y) configured to produce a color that is different from that of the light beams emanating from the single light source 300, i.e. the blue light beams, and a second region 340a configured to produce a color that is equal to that of the light beams emanating from the single light source 300, i.e. the blue light beams. The rotational wheel 340 includes a rotational axis which is the rotation shaft of a driving motor (not illustrated), and includes, on the circumferential region, three fluorescence regions (R, G, Y) which are the first region, and one reflection region 340a which is the second region. Hereinafter, the first region will be referred to as the "fluorescence regions (R, G, Y)", and the second region will be referred to as the "reflection region 340a".

Each of the fluorescence regions is coated with R/G/Y fluorescent substances. Each of the fluorescence regions (R, G, Y) is excited by incident light beams to produce R/G/B colors in a Lambertian beam shape. That is, each of the fluorescence regions is coated with R/G/N fluorescent substances on the rotational wheel in a predetermined shape in which the fluorescent substances include a fluorescent substance (G) that emits green color by being excited by the light beams, a fluorescent substance (R) that emits red color by being excited by the light beams, and a fluorescent substance (Y) that emits yellow color by being excited by the light beams. Each of the coated shapes of the fluorescent substances coated on the fluorescence regions (R, G, Y) may be variously changed. In addition, the intensity of the single light source 300 and the size of each of the fluorescent substance coated regions provided in the fluorescence regions (R, G, Y) of the rotational wheel 340 may be adjusted so as to adjust the R/G/Y colors.

The reflection region 340a is a region that reflects the light beams emanating from the single light source 300. As already described, the light beams emanating from the single light source 300 are blue light which is reflected from the reflection region 340a of the rotational wheel 340.

Preferably, in order to reflect the blue light beams, the reflection region 340a may be configured by being fabricated in a plurality of conical patterns, a semi-circular or semi-elliptical shape by sandblasting that produce Lambertian reflection light. Alternatively, the reflection region 340a may be configured by being coated with a white fluorescent substance, or by being provided with a reflecting material, for example, a mirror. The white fluorescent substance coated on the reflection region 340a may be formed by a high reflective white color diffusion fluorescent coating.

Alternatively, the reflection region 340a may be randomly provided with a plurality of reflectors through a plurality of conical patterns that produce Lambertian reflection light or by a sandblasting method. That is, the incident blue lights are reflected by the reflectors, which are randomly patterned. In the reflection region, a plurality of caved shapes are formed, in which a plurality of three-dimensional conical shapes, semi-circular shapes or pyramid shapes are randomly shaped so that the incident blue light beams are reflected toward the first prism.

Note that it was described earlier that when the single light source 300 is configured by a blue laser diode, a reflection region 340a should be provided in the rotational wheel 340 in order to reflect the blue color light beams. However, when the single light source 300 is configured by a UV (Ultra-Violet) laser diode, it is not required to provide the reflection region on the rotational wheel.

Figure 11:
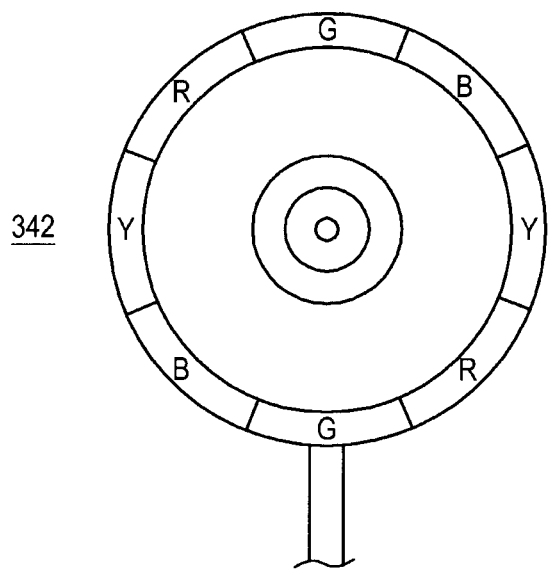
FIG. 11 is a plan view illustrating a rotational wheel used when an ultraviolet laser diode is employed as the single light source of the beam projector illustrated in FIG. 9.

FIG. 11 is a plan view illustrating a configuration of the rotational wheel 342 used when the single light source 300 is configured by a UV laser diode. Hereinafter, the configuration of the rotational wheel 342 will be described with reference to FIG. 11 together with FIG. 9.

The rotational wheel 342 illustrated in FIG. 11 has a configuration employed when a 405 nm wavelength UV laser diode is used as the single light source, in which the center of the rotational wheel 342 is a rotational shaft of a driving motor (not illustrated), and in the outer circumferential region, four fluorescence regions (R, G, Y, B) are provided. The fluorescence regions (R, G, Y, B) are the regions formed by alternately coating R/G/Y/B fluorescent substances. Each of the fluorescence regions (R, G, Y, B) is excited by incident light, thereby producing each of the R/G/Y/B colors in a Lambertian shape. Each of the produced colors, the optical path of which is changed by the first prism 320, thereby being directed toward a fly-eye lens 350.

Referring back to FIG. 9, descriptions will be made as to a configuration of a beam projector 10 provided with an illumination optical system according to the exemplary embodiments of the present invention. At first, the illumination optical system includes a single light source 300, first and second lens groups 310 and 330 configured to perform collimation/light collection, a rotational wheel 340 or 342, a fly-eye lens 350, a relay lens 360, a mirror 370, and a condensing lens 380 in this order with reference to the optical path. In the illumination optical system, the mirror 370 is a reflector used for changing the optical path of the light beams emitted from the light source as desired, and may not be provided in the illumination optical system.

As for the single light source 300, for example, a 450 nm wavelength blue laser diode or a 405 nm wavelength UV laser diode may be employed. The single light source 300 is operated according to a driving signal input from a driving unit (not illustrated).

In order to improve the efficiency from the light beams emitted from the single light source, a diffusion film or diffusion plate (not illustrated) may be provided. That is, the diffusion film or diffusion plate may be arranged between the single light source 300 and the first collimating lens 310. In addition, in order to produce light beams passing through the diffusion film or diffusion plate as a uniformized light beam shape, a beam shaper (not illustrated) may be further provided. The beam shaper (not illustrated) may be provided on the first collimating lens 310 or may be provided between the first collimating lens 310 and the first prism 320.

The light beams emitted from the single light source 300 pass through the first collimating lens 310. The first collimating lens 310 serves a function of collecting or collimating the light beams. The light beams, which pass through the first prism 320, are collected to the rotational wheel 340 or 342 by the second collimating lens 330. As for the first prism 320, an RTIR (Reverse Total Internal Reflection) prism is employed.

The second collimating lens 330 serves dual functions, i.e., a function of collecting the light beams passing through the first prism 320 toward the rotational wheel 340 or 342, and a function of collimating the light beams reflected by or emanating from the rotational wheel 340 or 342.

The light beams incident on the rotational wheel 340 or 342 excite the fluorescent substances (R/G/Y/B or R/G/Y) coated on the rotational wheel or are partially reflected. Accordingly, the light incident on the rotational wheel 340, 342 with a single wavelength band of 450 nm or 405 nm is converted into the light of a different wavelength band such as red, green, yellow or blue. The light beams, the optical path of which is changed by the first prism following the rotational wheel 304 or 342 are uniformized through the fly-eye lens 350 and then pass through the relay lens 360, in which the optical path of the light beams 360 is adjusted or rechanneled to a display pane 390 by the relay lens 360.

The light beams, which pass through the relay lens 360, suffer from a change of optical path by the mirror (dichroic mirror) 370. This includes an optical character loss in the light beam. Then, after passing through the collimating relay lens 380, the light beams arrive at the display panel 390 through the second prism 395. As for the display panel 390, a DMD (Digital Micrometer Display), an LCoS (Liquid Crystal on Silicon), an LCD, a GLV (Grating Light Valve), or an SOM (Spatial Optical Modulator) may be used.

As described above, the beam projector 10 is a compact beam projector for which miniaturization and lightening are important. Since a smaller number of optical elements and less optical paths are provided in the beam projector 10 as compared to the beam projector as described with reference to FIG. 1, the beam projector 10 according to the embodiment shown in FIG. 9 is advantageous in miniaturization and efficient in reducing the product cost while maintaining a high level of quality in projecting an image onto a screen.

Moreover, the path of the light beams emanating from the single light source 300 and the path emanating from the rotational wheel are arranged in the same optical axis direction, which makes it easy to align the elements of the optical system with reference to the optical direction. As a result, the mounting or aligning process of the optical elements becomes more convenient as compared to the prior art. In addition, since the configuration is made in such a manner that the light beams emanating from the rotational wheel are directed toward the fly-eye lens 350 through the first prism 320, in which the light beams emitted from the rotational wheel and the light beams directed toward the fly-eye lens 350 through the first prism 320 are perpendicularly oriented to each other, thus making it easy to mount and align the optical elements.

Figure 12:
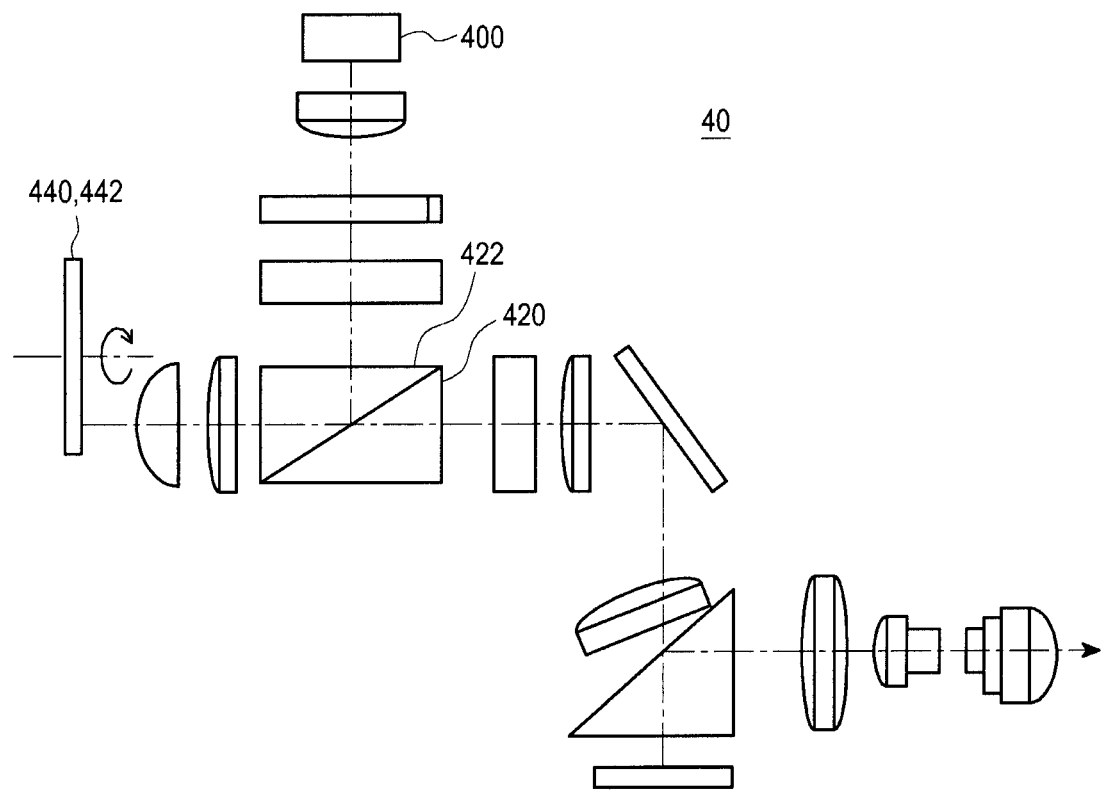
FIG. 12 is a configurational view schematically illustrating a modified example of the beam projector illustrated in FIG. 9 along an optical path.

FIG. 12 illustrates a modified example of the beam projector illustrated in FIG. 9 in according to yet another embodiment of the present invention. The descriptions on the configurations of the single light source and the rotational wheel among the components of the optical system of the beam projector illustrated in FIG. 12 will be omitted since they were described in detail with reference to FIGS. 10 and 11. The beam projector illustrated in FIG. 12 is different from the beam projector illustrated in FIG. 10 with respect to the optical paths and prism configurations. Accordingly, in describing the beam projector 40 illustrated in FIG. 12, only the different configurations of the optical systems according to the optical paths as compared to the beam projector 10 illustrated in FIG. 9 will be described and overlapped description will be omitted to avoid redundancy.

As illustrated in FIG. 12, the beam projector 40 includes an illumination optical system and a projection optical system in relation to a display panel. In the illumination optical system, the optical paths of the light beams emanating from the single light source 400 and the light beams incident on/emitted from a rotational wheel 440 or 442 are perpendicularly oriented to each other by a pair of first prisms 420 and 422. The first prisms 420 and 422 are configured by two total internal reflection prisms which are arranged to be in close contact with each other at the inclined surfaces thereof.

The illumination optical system configured as described above has an advantage in that because a light emitted from a single light source is capable of being processed to produce red, green and blue lights which are in turn capable of being incident on the display panel through the same optical path, the number of optical component, for example, lenses and mirrors arranged on the optical path can be reduced. In addition, the illumination optical system has advantages in that because the miniaturization is facilitated as the number of optical components is reduced, the illumination optical system may contribute to the miniaturization of a beam projector. Furthermore, the illumination optical system may facilitate the installation of the beam projector to, for example, a portable terminal.

In addition, the inventive illumination optical system implements R/G/Y/B colors using only a single blue or UV laser diode light source and, thus, may reduce the manufacturing costs. In particular, the collimating lens employed in the inventive beam projector performs both the beam focusing and collimating functions, and, thus, the number of optical elements may be reduced. Accordingly, the manufacturing costs may be further reduced and the beam projector may be miniaturized.

Also, there is an advantage in that the optical efficiency may be maintained regardless of the number of laser diode light sources due to the first prism employed in the inventive beam projector. Further, the light beams incident on and emitted from the rotational wheel are in the same axis, which may improve the optical efficiency and help the alignment of optical system elements.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An illumination optical system for a beam projector, comprising:
   at least one light source for generating a light;
   a color conversion unit having at least one fluorescent substance layer that reflects light emitted from the at least one light source or converts a wavelength of the light emitted from the at least one light source to a wavelength-converted light, the at least one fluorescent substance layer comprising:
      a reflective plate that is rotated about a rotation axis parallel to the direction of an optical axis of the wavelength-converted light emitted from the color conversion unit; and
      a green fluorescent substance layer and a red fluorescent substance layer around the reflective plate configured to be excited by the light emitted from the at least one light source to emit a green light and a red light, respectively;
   at least one dichroic mirror disposed at a predetermined angle for deflecting the light emitted from the at least one light source to be incident on the color conversion unit, the at least one dichroic mirror comprising:
      a first reflective area for reflecting the blue laser light to be incident on the color conversion unit;
      a second reflective area formed around the first reflective area for reflecting a blue laser light to be incident on the color conversion unit; and
      a transmissive area formed between the first reflective area and the second reflective area,
   wherein the green and red lights emitted by the fluorescent substance layer are transmitted through the first and second reflective areas and the transmissive area, and the blue light reflected by a reflective layer of the color conversion unit is transmitted through the transmissive area,
   wherein the reflected light or the wavelength-converted light by the conversion unit are incident on a display panel through a same path.

2. The system of claim 1, wherein the at least one light source is a laser diode that produces the blue laser light or a ultra-violet laser light.

3. The system of claim 1, further comprising a reflective layer that reflects the blue laser light emitted from the at least one light source.

4. The system of claim 3, wherein the reflective layer is formed by a plurality of conical or pyramid-shaped reflective protrusions.

5. The system of claim 1, wherein the at least one fluorescent substance layer of the color conversion unit further includes a yellow fluorescent layer around the reflective plate configured to be excited by the light emitted from the at least one light source to emit a yellow light.

6. The system of claim 1, wherein the transmissive area has a circular or oval band shape.

7. The system of claim 1, further comprising at least one condensing lens, disposed between the color conversion unit and the dichroic mirror, for causing the light reflected by the dichroic mirror to be incident on the color conversion unit and for aligning a propagation direction of the light emitted by the color conversion unit to be substantially parallel to a direction of the optical axis of the at least one condensing lens so that the light emitted by the color conversion unit is incident on the dichroic mirror.

8. The system of claim 1, further comprising a diffusion plate disposed between the at least one light source and the at least one dichroic mirror.

9. The system of claim 8, further comprising a lens disposed between the diffusion plate and the at least one light source for adjusting a path or beam shape of the light emitted from the at least one light source.

10. A portable terminal having a beam projector and comprising the illumination optical system of claim 1.

11. The system of claim 1, further comprising:
    a rotational wheel including: circumferential regions coated with a plurality of fluorescent substances, which are excited by light beams incident from the at least one light source, for reflecting the light beams so as to produce a different color from a color of the light beams, and a region which reflects light beams incident from a prism so as to produce a color which is the same as the light beams.

12. The system of claim 11, wherein the at least one light source is a blue laser diode.

13. The system of claim 11, wherein the region which reflects the same color as the light source is formed by a plurality of conical or elliptical patterns which produce Lambertian reflection light.

14. The system of claim 11, wherein the region which reflects light beams is coated with a white fluorescent substance or a reflective material.

15. The illumination optical system of claim 11, wherein:
    the at least one fluorescent substance layer further comprises R/G/Y/B fluorescent substances excited by light beams incident from the at least one light source.

16. The system of claim 15, wherein the at least one light source is an ultraviolet laser diode.

17. A beam projector comprising an illumination optical system wherein the illumination optical system including:
    a single light source;
    a first prism which totally reflects light beams emanating from the single light source;
    a rotational wheel including circumferential regions coated with a plurality of fluorescent substances, which are excited by light beams incident from the single light source, for reflecting the light beams so as to produce a color different from a color of the light beams, and a region which reflects light beams incident from a prism so as to produce a color which is the same as the light beams, the region being formed by a plurality of conical or elliptical patterns that produce Lambertian reflection light; and
    a lens system which collects the light beams emanating from the single light source to the rotational wheel or collimates the light beams emanating from the rotational wheel, wherein the light beams emanating from the illumination optical system are incident on a display panel, and the light beams emanating from the display panel are projected to a screen through a projection lens system, and wherein a plurality of semi-elliptical patterns are randomly formed in the region which reflects light beams through sand blasting.

18. The beam projector of claim 17, wherein the single light source is a blue laser diode which emits blue laser, and the regions coated with the fluorescent substances are coated to be divided according to R/G/Y colors so that the fluorescent substances are excited by light beams incident according to each of the colors.

19. The beam projector of claim 17, wherein the light beams emanating from the single light source and the light beams incident on/reflected from the rotational wheel are arranged on the same optical axis.

20. The beam projector of claim 17, further comprising:
a diffusion film or diffusion plate between the single light source and the first prism.

21. The beam projector of claim 17, wherein the light beams emanating from the illumination optical system are uniformized by passing through a fly-eye lens and pass through a relay lens, a mirror, a condensing lens, and a second prism in sequence so that the uniformized light beams propagate to the display panel.

22. The beam projector of claim 21, wherein the optical path of the light beams emanating from the display panel is changed by the second prism to be directed to the projection lens system.

23. The beam projector of claim 21, wherein the first prism is a TIR prism, and the second prism is an RTIR prism.

24. The beam projector of claim 17, the display panel is configured by a DMD or an LCoS.

25. A beam projector comprising an illumination optical system, wherein the illumination optical system including:
a single light source;
first and second prisms which totally reflect light beams emanating from the single light source to change or correct an optical path thereof;
a rotational wheel including circumferential regions coated with a plurality of fluorescent substances, which are excited by light beams incident from the single light source, for reflecting the light beams so as to produce a color different from a color of the light beams, and a region which reflects light beams incident from a prism so as to produce a color which is the same as the light beams; and
a lens system which collects the lights emanating from the single light source to the rotational wheel or collimates the light beams emanating from the rotational wheel,
wherein the light beams emanating from the illumination optical system are incident on a display panel and are uniformized by passing through a fly-eye lens and pass through a relay lens, a mirror, a condensing lens, and a second prism in sequence so that the uniformized light beams propagate to the display panel.

* * * * *